(12) United States Patent
Vestola et al.

(10) Patent No.: US 6,521,090 B1
(45) Date of Patent: Feb. 18, 2003

(54) METHOD AND DEVICE FOR CHANGING THE NATURAL FREQUENCY OF A NIP ROLL CONSTRUCTION IN A PAPER OR BOARD MACHINE

(75) Inventors: Juhani Vestola, Jyväskylä (FI); Jorma Köliö, Jyväskylä (FI); Arto Puranen, Jyväskylä (FI)

(73) Assignee: Metso Paper, Inc., Helsinki (FI)

( * ) Notice: Subject to any disclaimer, the term of this patent is extended or adjusted under 35 U.S.C. 154(b) by 0 days.

(21) Appl. No.: 09/744,555

(22) PCT Filed: Jul. 16, 1999

(86) PCT No.: PCT/FI99/00631

§ 371 (c)(1),
(2), (4) Date: Jan. 24, 2001

(87) PCT Pub. No.: WO00/05450

PCT Pub. Date: Feb. 3, 2000

(30) Foreign Application Priority Data

Jul. 24, 1998 (FI) .................................................. 981657

(51) Int. Cl.[7] .............................. D21F 3/00; D21G 7/00
(52) U.S. Cl. ........................ 162/199; 162/272; 100/170; 492/20
(58) Field of Search ................................ 162/198, 199, 162/204, 205, 252, 263, 272, 358.1, 262; 100/35, 162 R, 162 B, 163 A, 164, 168–170; 700/127, 128, 129; 492/7, 20

(56) References Cited

U.S. PATENT DOCUMENTS

| | | | |
|---|---|---|---|
| 3,928,994 A | | 12/1975 | Ichiryu et al. .................... 72/8 |
| 4,290,353 A | * | 9/1981 | Pav et al. ................. 100/162 B |
| 4,389,933 A | * | 6/1983 | Pav ......................... 100/162 B |
| 4,392,288 A | * | 7/1983 | Anstotz et al. .......... 29/116 AD |
| 4,470,121 A | * | 9/1984 | Ebert .......................... 364/508 |
| 4,471,515 A | * | 9/1984 | Takenaka et al. ............. 29/110 |
| 4,546,425 A | * | 10/1985 | Breitholtz .................... 264/153 |
| 4,685,063 A | | 8/1987 | Weihrich et al. ............. 364/472 |
| 4,910,842 A | | 3/1990 | Brendel ......................... 29/110 |
| 5,022,319 A | | 6/1991 | Biondetti ..................... 100/170 |
| 5,024,150 A | * | 6/1991 | Brendel et al. ................ 100/35 |
| 5,235,909 A | * | 8/1993 | Gerstenberger et al. .... 101/216 |
| 5,961,899 A | * | 10/1999 | Rosetti et al. .............. 264/40.1 |
| 6,156,158 A | * | 12/2000 | Kustermann ................. 162/198 |

FOREIGN PATENT DOCUMENTS

| | | |
|---|---|---|
| EP | 0315567 | 5/1989 |
| EP | 0779394 | 6/1997 |
| FI | 892160 | 5/1989 |
| FI | 82127 | 9/1990 |
| FI | 85166 | 11/1991 |
| FI | 94458 | 5/1995 |
| JP | 3082843 | 4/1991 |
| JP | 11147121 | 6/1999 |
| WO | 9840558 | 9/1998 |

* cited by examiner

Primary Examiner—Steven P. Griffin
Assistant Examiner—Eric Hug
(74) Attorney, Agent, or Firm—Steinberg & Raskin, P.C.

(57) ABSTRACT

The invention concerns a method and a device for changing the natural frequency of a nip roll construction in a paper or board machine so that the rigidity of one or several loading elements, for example loading cylinder or loading beam, in the nip roll construction is varied. The loading cylinder with adjustable rigidity in accordance with the invention comprises a cylinder (11), into which two pistons (12, 13) have been fitted. The pistons (12, 13) have been attached each of them to a piston rod (14, 15) of its own, which piston rods have been passed through the end walls (11a, 11b) of the cylinder (11). Thus, in the cylinder (11), between the pistons (12, 13), a work pressure space (16) is formed, and at the opposite sides of the pistons (12, 13) counter-pressure spaces (18, 20) are formed. The pressure in and the volume of the work pressure space (16) are kept invariable, and the volumes of the counter-pressure spaces (18, 20) are varied, in which connection the cylinder (11) moves on the piston rods (14, 15), and the rigidity of the loading cylinder can be varied.

10 Claims, 7 Drawing Sheets

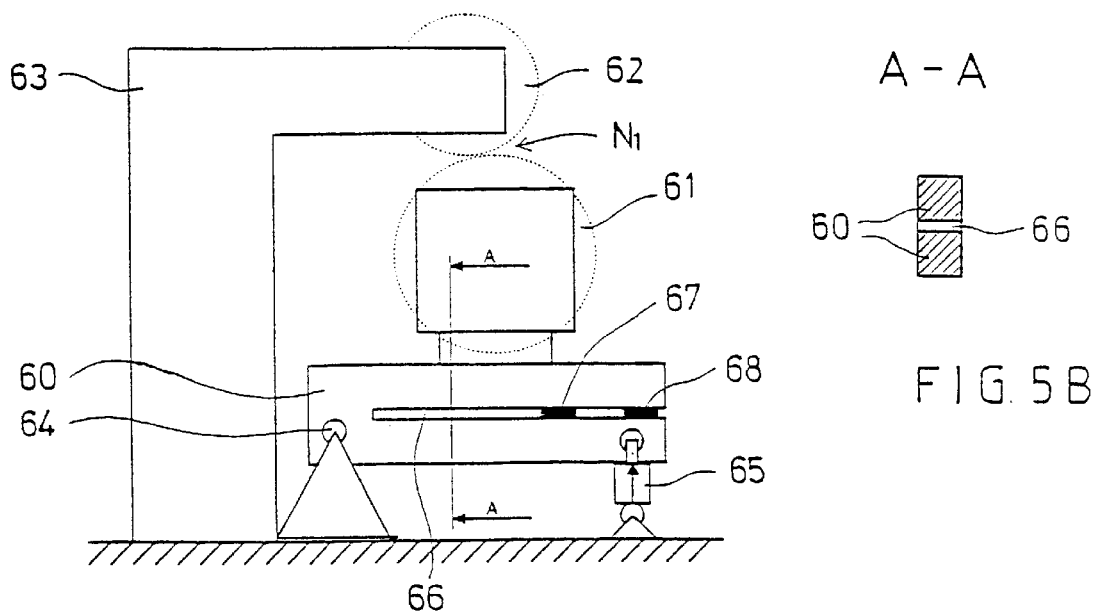
FIG. 5A
FIG. 5B
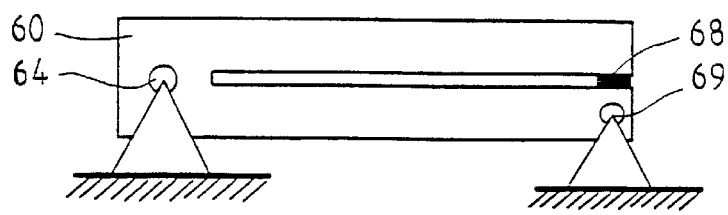
FIG. 5C
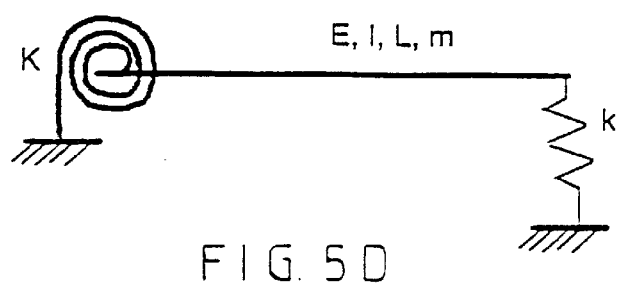
FIG. 5D $\alpha = 0.19$
$s = 3.95$ $$\alpha = \beta = 0.75$$

$\alpha = 0.74$
$\beta = 1.31$

METHOD AND DEVICE FOR CHANGING THE NATURAL FREQUENCY OF A NIP ROLL CONSTRUCTION IN A PAPER OR BOARD MACHINE

FIELD OF THE INVENTION

The present invention relates to a method for changing the natural frequency of a nip roll construction in a paper board machine and a loading cylinder for nip roll construction in a paper or board machine. The present invention also relates to a loading beam in a nip roll construction in a paper or board machine and a nip roll construction in a paper or board machine, the nip roll construction including two rolls which form the nip.

BACKGROUND OF THE INVENTION

In paper machines and in paper finishing devices, vibrations constitute quite a considerable problem, and in the present-day systems, in an attempt to achieve ever higher speeds, the problems of vibration have been manifested ever more clearly. There are several possible sources of vibration in paper machines, and some of the most important ones of these sources are rolls and cylinders, which comprise a large mass that revolves at a considerably high speed. Of course, in connection with manufacture, attempts are made to make the dimensional precision of rolls as good as possible and, moreover, the rolls are balanced in order to eliminate vibrations.

In present-day paper machines and paper finishing devices, however, ever increasing use is made of rolls provided with soft coatings, which rolls may constitute a considerable source of vibration during operation. Such rolls are used, for example, in on-line and off-line calenders, coating machines, size presses, supercalenders, and equivalent, in which said roll provided with a soft coating forms a nip with another roll. Through the nip, a paper web and possibly a felt, wire or equivalent are passed. In such a nip roll solution, when a joint or splice of a wire, felt or web, considerable impurities, or something else that causes a considerable change in the thickness of the web passing through the nip runs through the nip during operation, the coating has to yield, in which case the coating acts as a spring that activates vibration. For example, in a size press and in a coating device of the type of a size press, the nip is formed by means of two rolls so that one nip roll has been mounted by means of bearing housings directly on the frame construction of said device, whereas the opposite roll has been mounted by means of its bearing housings on loading arms, which have been linked on the frame construction of the machine. In such a case, in particular, the roll mounted on loading arms starts vibrating, in which connection the coating on the soft-faced roll is deformed, as a result of which the vibration is intensified and the roll starts resonating.

One common prior-art mode of eliminating such vibrations is a change in the running speed of the machine so that, at the running speed concerned, the vibration is no longer intensified but starts being attenuated. Thus, problems of vibration have restricted the running speed of the machine.

In the applicant's FI Patent 82,127, a method and a device are described for attenuation of vibration of rolls, in particular in a pair of rolls that form a nip in a press section. In the method, the nip is run into the closed position and to the desired linear load of running so that the load produced by the loading devices of the pair of rolls is stabilized to a regulated level. After the desired linear load of running has been reached and after the load produced by said loading means has been stabilized, the bearing housings of the rolls constituting the pair of rolls are coupled with each other rigidly so that their relative movement is prevented.

In the applicant's FI Patent 85,166, a method and a device developed further from the above FI Patent 82,127 are described for attenuation of vibration of rolls that form a nip, in particular in a pair of rolls that form a nip in a press section. In the method, the bearing housings of the rolls in the pair of rolls are supported against each other by means of an attenuator device, by whose means relative movements of the rolls that form the pair of rolls, which movements arise from vibration, are attenuated and absorbed. The attenuation is carried out by means of a hydraulically operating attenuator device which comprises a piston-cylinder construction and into which a hydraulic pressure medium is passed and out of which said pressure medium is removed. By means of the attenuator device, the flow of hydraulic pressure medium caused by the relative movement in the piston-cylinder construction arising from the rolls in the pair of rolls is intensified, and said intensified flow is throttled in order to produce attenuation of vibration.

In the applicant's FI Patent 94,458, a method and an equipment are described, by whose means the critical speed of a roll can be changed in view of prevention of vibration. The critical speed of a roll can be changed by changing the mass of the roll and/or by changing the rigidity of the suspension of the roll and/or by changing the location of the roll suspension point in the axial direction of the roll and/or by changing the elastic constant of the journalling of the roll and/or by supporting the roll from the roll face by means of a displaceable support roller.

In the applicant's FI Patent Application 971864, a method is described for attenuation of oscillation in a paper machine or in a paper finishing device by means of a dynamic attenuator, which comprises an additional weight suspended on the oscillating object by means of a spring. In the method, the oscillation frequencies of the oscillating object are measured constantly by means of one or several oscillation detectors. The measurement signals given by the oscillation detector are amplified by means of an amplifier and fed into an oscillation analyzer, which identifies the problematic excitation frequency and converts said problematic excitation frequency into a control signal. The control signal is fed into a control device, by whose means the elastic constant of the spring of the dynamic attenuator and/or the mass of the dynamic attenuator is/are changed in order to make the specific frequency of the dynamic attenuator substantially equal to the problematic excitation frequency. The dynamic attenuator may consist, for example, of a substantially horizontal bar attached to a bearing housing of the roll, an additional weight being suspended on said bar and the location of the weight on the bar being displaceable.

OBJECTS AND SUMMARY OF THE INVENTION

The method and the device in accordance with the invention are particularly well suited for use in a nip roll construction in which a roll nip is formed between a soft-faced roll and a hard-faced roll. In such constructions, rapidly increasing vibrations may arise through deformation of the coating on the soft-faced roll, and it must be possible to bring such vibrations under control.

This is accomplished in the present invention so that the rigidity, and so also the natural frequency, of the nip roll construction is varied before the deformation has had time to develop too far, in which case it is possible to keep the level of vibration under control. The rigidity of the nip roll construction can be varied so that the rigidity of one or several loading elements that form the nip roll construction is varied. In the invention, the rigidity of the nip roll construction is influenced by means of a loading cylinder whose rigidity can be regulated and/or by means of a loading beam whose rigidity can be regulated, each of which (cylinder and/or beam) forms one loading element in the nip roll construction. In the invention, the rigidity of a loading element or elements is varied while the linear load in the nip or the rest of the operation of the nip is not influenced. Thus, regulation of the rigidity of a loading element has no effect on the properties of the paper running through the nip.

The regulation of the rigidity of the loading element can be carried out in an oscillating way, in which case the regulation does not have to be connected with measurement of the vibrations of the nip roll construction. The regulation of the rigidity of the loading element can also be made automatic. In such a case, the vibration frequencies of the vibrating object are measured continuously by means of one or several oscillation detectors. The measurement signals given by an oscillation detector are amplified by means of an amplifier and fed to an oscillation analyzer, which identifies a problematic excitation frequency and converts said problematic excitation frequency into a regulation signal. The regulation signal is fed into a regulation device, by whose means the rigidity of one or several loading elements of the nip roll construction is varied.

BRIEF DESCRIPTION OF THE DRAWINGS

In the following, the invention will be described with reference to the figures in the accompanying drawings, the invention being, however, not supposed to be confined to the details of said illustrations alone.

FIG. 5 illustrates a loading beam in accordance with the invention whose rigidity can be regulated and by whose means the vibrations in a nip roll construction can be prevented or attenuated.

DETAILED DESCRIPTION OF THE INVENTION

Figure 1:
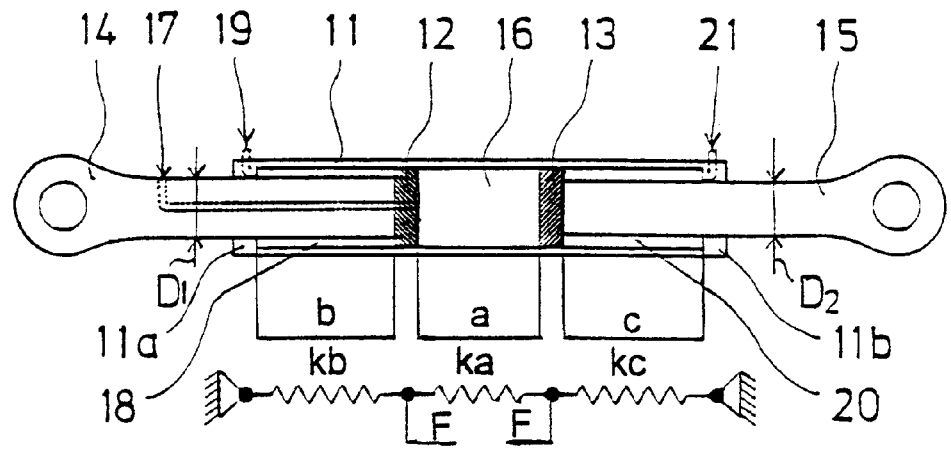
FIG. 1 illustrates a loading cylinder in accordance with the invention whose rigidity can be regulated and by means of which cylinder the vibrations in a nip roll construction can be prevented or attenuated.

FIG. 1 illustrates a loading cylinder whose rigidity can be regulated. The loading cylinder comprises a cylinder 11, into which two axially mobile pistons 12,13 have been fitted, whose piston rods 14,15 have different diameters $D_1, D_2$ smaller than the inner diameter of the cylinder 11. Thus, in the interior of the cylinder 11, three separate pressure spaces 16,18,20 are formed. The first piston rod 14 connected with the first piston 12 has been passed through the first end wall 11a of the cylinder 11, and the second piston rod 15 connected with the second piston 13 has been passed through the second end wall 11b of the cylinder 11. Between the first 12 and the second piston 13, a first pressure space 16 is formed, into which a first pressure medium duct 17 passes, which has been formed into the first piston rod 14 and into the first piston 12. In the space between the outer face of the first piston rod 14, the inner face of the cylinder 11, the first piston 12, and the first end wall 11a of the cylinder 11, a second pressure space 18 is formed, into which a second pressure medium duct 19 passes, which has been formed into the first end wall 11a of the cylinder 11. In the space between the outer face of the second piston rod 15, the inner face of the cylinder 11, the second piston 13, and the second end wall 11b of the cylinder 11, a third pressure space 20 is formed, into which a third pressure medium duct 21 passes, which has been formed into the second end wall 11b of the cylinder 11. The diameter $D_1$ of the first piston rod 14 is larger than the diameter $D_2$ of the second piston rod 15.

In the loading cylinder as shown in FIG. 1 whose rigidity can be regulated, the pistons 12,13 and the piston rods 14,15 connected with them are kept stationary, and the cylinder 11 is displaced in an oscillating way by means of a pressure medium fed into the second 18 and the third 20 pressure space. The pressure $p_a$ in, and the volume $V_a$ of, the first pressure space 16 are kept invariable in a running situation. The oscillating movement is produced by varying the volumes $V_b, V_c$ of the second 18 and the third 20 pressure space, but their pressures $p_b, p_c$, which are of different levels, are kept invariable. The lengths of the first 16, the second 18, and the third 20 pressure space are denoted with the references a,b,c.

In FIG. 1, an equivalent diagram illustrating the compression of the pressure medium in the pressure spaces 16,18,20 in the cylinder has also been drawn. Therein the elastic constants are denoted with the references $k_a, k_b, k_c$.

Figure 2:
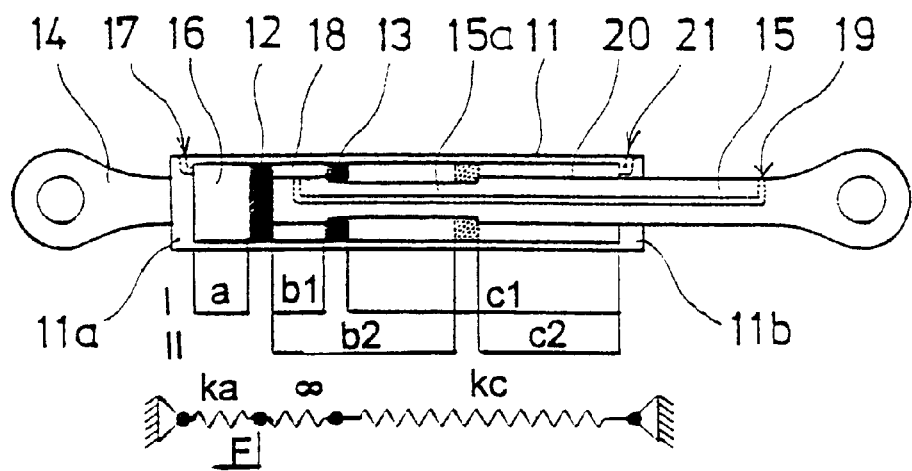
FIG. 2 illustrates a modification of a loading cylinder whose rigidity can be regulated.

FIG. 2 illustrates a modification of a loading cylinder whose rigidity can be regulated. The loading cylinder comprises a cylinder 11, into which two pistons 12, 13 have also been fitted. The first piston 12 has been attached to a piston rod 15, and the second piston 13 moves by the effect of a pressure medium on a thinner 15a portion of the piston rod 15 inside the cylinder 11. The piston rod 15 has been passed through the second end wall 11b of the cylinder 11. Further, a support arm 14 has been attached to the first end wall 11a of the cylinder 11. In the space defined by the first piston 12, by the first end wall 11a of the cylinder 11 and by the wall of the cylinder 11, a first pressure space 16 is formed, into which a first pressure medium duct 17 passes, which has been formed into the first end wall 11a of the cylinder 11. On the other hand, in the space defined by the first piston 12, by the second piston 13, by the outer face of the piston rod 15, and by the inner face of the cylinder 11, a second pressure space 18 is formed, into which a second pressure medium duct 19 is passed, which has been formed into the piston rod 15. Further, in the space defined by the second piston 13, by the second end wall 11b of the cylinder, by the outer face of the piston rod 15, and by the inner face of the cylinder 11, a third pressure space 20 is formed, into which a third pressure medium duct 21 passes, which has been formed into the second end wall 11b of the cylinder.

In the loading cylinder as shown in FIG. 2 whose rigidity can be regulated, the first piston 12 and the connected piston rod 15 are kept stationary, and the second piston 13 is displaced in an oscillating way by means of a pressure medium fed into the second 18 and the third 20 pressure space. The pressure $p_a$ in, and the volume $V_a$ of, the first pressure space 16 are kept invariable in a running situation. The oscillating movement is produced by varying the volumes $V_b, V_c$ of the second 18 and the third 20 pressure space, but their pressures $p_b, p_c$, which are of different levels, are kept invariable. The lengths of the first 16, the second 18, and the third 20 pressure space, when the second piston 13 is in the position I, are denoted with the references $a, b_1, c_1$, and when the second piston is in the position II, said lengths are denoted with the references $a, b_2, c_2$.

Figure 3:
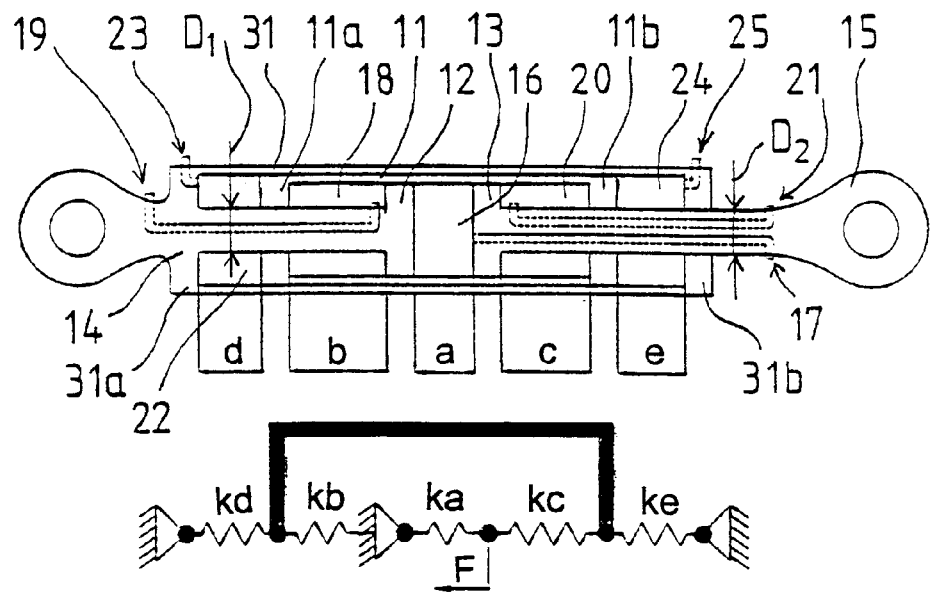
FIG. 3 illustrates a second modification of a loading cylinder whose rigidity can be regulated.

FIG. 3 illustrates a second modification of a loading cylinder whose rigidity can be regulated. In this embodiment, two cylinders 11,31 fitted one inside the other are employed. The inner cylinder 11 is similar to the construction shown in FIG. 1, and, at the same time, the inner cylinder operates as a piston in the outer cylinder 31. The first piston rod 14 has been attached to the first end wall 31a of the outer cylinder 31, in which case the piston rod 14 and so also the first piston 12 are stationary in relation to the outer cylinder 31. The second piston rod 15 has been passed through the second end wall 31b of the outer cylinder 31. In the end portions of the outer cylinder 31, there are pressure spaces 22,24 defined by the first cylinder 11, by the outer faces of the piston rods 14,15, and by the inner faces of the outer cylinder 31, into which pressure spaces 22,24 pressure medium ducts 23,25 pass, which have been formed into the end walls 31a,31b of the outer cylinder.

In the loading cylinder as shown in FIG. 3 whose rigidity can be regulated, the first piston 12 and the connected piston rod 14 have been locked in place in relation to the outer cylinder 31. The second piston 13 and the connected second piston rod 15 are also kept stationary. On the contrary, the inner cylinder 11 is displaced in an oscillating way by means of a pressure medium fed into a second 18, third 20, fourth 22, and fifth 24 pressure space. The pressure $p_a$ in, and the volume $V_a$ of, the first pressure space 16 are kept invariable in a running situation. The oscillating movement is produced by varying the volumes $V_b, V_c, V_d, V_e$ of the second 18, third 20, fourth 22, and fifth 24 pressure space, but the pressures $p_b, p_c, p_d, p_e$ in said spaces, which are of different levels, are kept invariable. The lengths of the first 16, second 18, third 20, fourth 22, and fifth 24 pressure space are denoted with the references a,b,c,d,e.

The alternative embodiment illustrated in FIG. 3 permits large differences in rigidity in the extreme positions because of the second stationary piston 12, on one hand, and because of the mobile inner cylinder 11, on the other hand.

Figure 4:
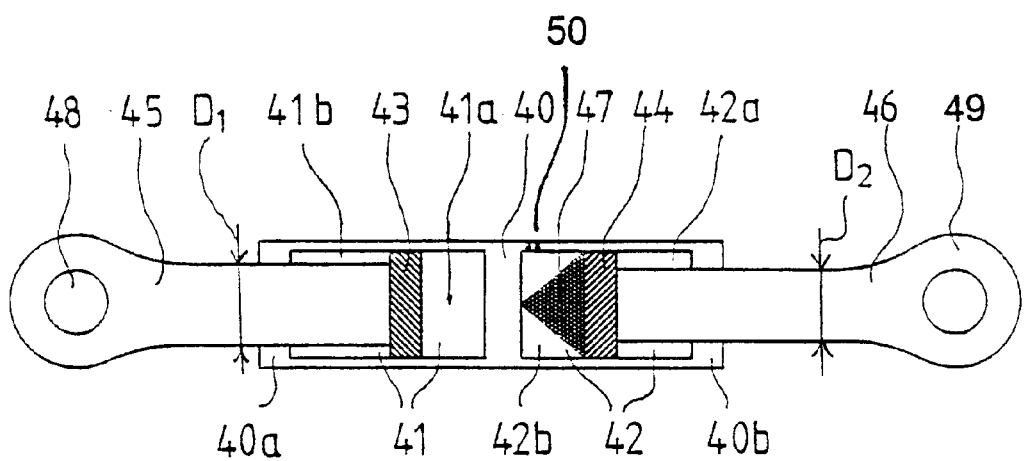
FIG. 4 illustrates a third modification of a loading cylinder whose rigidity can be regulated.

FIG. 4 illustrates a third modification of a loading cylinder whose rigidity can be regulated. The loading cylinder comprises a cylinder 40 which has been divided into two pressure chambers 41,42. Into each pressure chamber 41,42, pistons 43,44 attached to piston rods 45,46 have been fitted. The piston rods 45,46 have been passed through the end walls 40a,40b of the cylinder 40. The first piston 43 divides the first pressure chamber 41 into a pressure space 41a of loading pressure and into a pressure space 41b of counter-pressure side. The second piston 44 divides the second pressure chamber 42 into a pressure space 42a of rigidity regulation pressure and into an expansion space 42b. Further, into the expansion space 42b, a piece, for example a cone 47, has been fitted, which piece has been made of a material that behaves elastically, for example of rubber, polymer or of a corresponding material, and which piece allows a part of the expansion space 42b to remain free in the idle state of the loading cylinder. The tip of the cone 47 rests against the front wall of the second pressure chamber 42, and the bottom of the cone 47 rests against the second piston 44. The pressure space 42b that surrounds the cone 47 is at a vacuum or filled with a gas which permits deformation of the cone 47.

In the embodiment shown in FIG. 4, the rigidity of the loading cylinder is regulated by means of said cone 47. When the cone 47 is compressed by means of a pressure medium passed into said pressure space 42a of rigidity regulation pressure, the rigidity of the loading cylinder can be increased, and the other way round. By means of the design of the cone 47, it is possible to affect the interdependence of rigidity and counter-pressure. Since polymers are substantially non-compressible, they become very rigid when they fill the space provided for them completely. When the pressure space 42a, the pressure medium, throttles, valves, hoses, the pressure accumulator, etc. constructive solutions are selected in an appropriate way, the range of regulation of the rigidity of the cylinder can be widened further. When the cone 47 is compressed and the other way round, of course, the first piston 43 and the first piston rod 45 attached to it must move in a corresponding way in order that the distance between the fastening points 48,49 of the piston rods 45,46 should remain invariable. This takes place automatically, because the loading pressure in the chamber 41a, which loading pressure remains invariable, pushes the first piston 43 and so also the first piston rod 45 the same distance outwards as the second piston rod 46 moves inwards.

In the embodiment shown in FIG. 4, as an alternative, a small bleeding hole 50 can be made into the pressure space 42, in which case compressible gas does not remain deteriorating the increase in rigidity. A piece 47 made of an elastic material can, alternatively, also be fitted in the space 42a, in which case the pressure space 42b operates as a pressure space for rigidity regulation pressure. In stead of a piece 47 made of a material that behaves elastically, it is also possible to use, for example, a spiral spring or a conical helical spring or a spring pack.

FIG. 5a illustrates a loading beam in accordance with the invention whose rigidity can be regulated, by means of which beam the vibrations in a nip roll construction can be prevented or attenuated. FIG. 5b is a cross-sectional view of the loading beam 60. The loading beam 60, which supports the lower roll 61 of the nip roll construction, has been attached, from one of its ends, by means of an articulated joint 64, to the floor constructions, and from its opposite end, by the intermediate of a loading cylinder 65, to the floor constructions. The upper roll 62 in the nip roll construction has been attached to the stationary frame 63. By means of the loading cylinder 65, the nip $N_1$ between the rolls 61,62 can be opened and closed. The shape of the loading beam 60 is favourably that of a letter U lying on its side, in which case a cavity 66 is formed in its interior. Into the cavity 66, at least one tightening device 67,68 has been fitted, by whose means the rigidity of the loading beam 60 can be varied. Without a tightening device 67,68, the loading beam 60 is highly resilient, but when the tightening devices 67,68 have been switched on, the rigidity approaches the rigidity of a solid beam. As a tightening device 67,68, it is possible to use, for example, a hydraulic wedge, which can, if necessary, be hidden in the interior of a lining of the beam construction 60. If the tightening devices 67 and 68 are placed in different locations in the beam 60, the rigidity of the beam 60 can be regulated between several discrete values. Regulation of the rigidity of the loading beam 60 can be carried out during running.

The loading beam 60 as shown in FIG. 5 whose rigidity can be regulated can also be mounted from both ends fixedly on the floor constructions, in which case the upper roll 62 in the nip roll construction has been attached to the frame construction by means of an articulated joint or equivalent so that the nip can be opened by shifting the upper roll 62 apart from the lower roll 61.

FIG. 5C shows a loading beam 60 as shown in FIG. 5A whose rigidity can be regulated, which beam has been supported rigidly from both ends, by means of the articulation points 64,69, on the floor constructions. On the other hand, FIG. 5D illustrates an equivalent coupling of the loading beam shown in FIG. 5C. The left end of the upper part of the beam consists of a torsion spring, whose elastic constant consists, among other things, of the resilience of the lower part. The denotations used in the equivalent coupling are as follows:

K=elastic constant of the torsion spring
E=coefficient of elasticity of the beam
I=axial square torque of the beam
L=length of the beam
m=mass of the beam
k=elastic constant of translation spring Here it can be assumed that the ratio KL/EI=100. When a rigidifying piece 68 is not in its place, the ratio $kL^3/EI=0$, because k=0. In such a case, the coefficient $\lambda_a$ that is obtained for the relative value of a first natural frequency of the beam is $\lambda_a=1.857$. In a corresponding way, after the rigidifying piece 68 has been wedged into its place, the rigidity k produced by it is very high, and it can be assumed that $kL^3/EI=1000$. In such a case, the coefficient $\lambda_b$ that is obtained for the relative value of a first natural frequency of a rigidified beam is $\lambda_b=3.861$.

Thus, the natural frequency ($\lambda_b$) of a first bending form of the beam is twice as high as in the case of a free end ($\lambda_a$). In this example, exclusively the change in the rigidity of the beam is examined, but it illustrates the effect of marginal terms on the natural frequencies if a considerable portion of the rigidity of the nip construction is connected with its support constructions.

Figure 6:
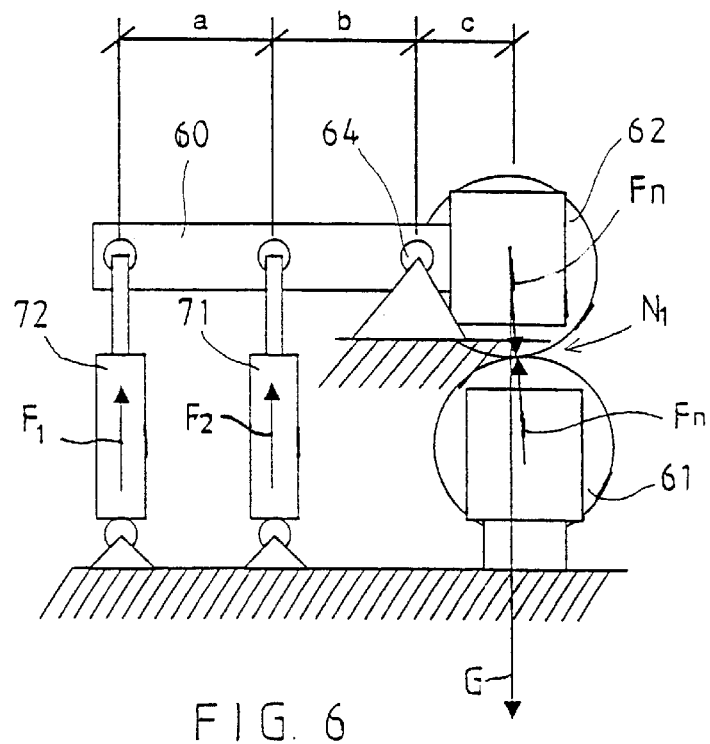
FIG. 6 illustrates a second loading beam in accordance with the invention whose rigidity can be regulated.

FIG. 6 illustrates a second embodiment of a beam 60 whose rigidity can be regulated. The nip force is produced by means of a construction in which the lower roll 61 has been attached to the frame of the device fixedly, and the upper roll 62 has been attached to the loading beam 60, which is supported on the frame of the device by means of an articulated joint 64. At the opposite side of the articulated joint 64 in relation to the roll 62, two loading cylinders 71 and 72 have been installed between the loading beam 60 and the floor constructions. The forces produced by the loading cylinders 71 and 72 are denoted with the references $F_1$ and $F_2$. Owing to the forces $F_1$ and $F_2$ of the loading cylinders 71 and 72 and owing to the force resultant G arising from the mass of the mobile part of the construction, a nip force $F_n$ is produced. The torque around the articulation point 64 is=0, in which case the desired nip force $F_n$ is obtained from the equation $F_n=G+F_2*b/c+F_1(a+b)/c$.

For the sake of simplification, it has been assumed here that the nip is in a vertical position, in which case the gravity component acting upon the nip is also vertical.

Thus, the desired nip force can be produced by means of different pairs of forces $F_1,F_2$. The choice of the forces has a substantial effect on the natural frequencies of the construction if the resilience of the loading arm 60 is sufficiently large, for the marginal terms of the support vary. If necessary, it is possible to use just one of the loading cylinders 71,72 for producing the force, or the forces can also be chosen to be opposite to one another. At least one of the loading cylinders 71,72 must be a dual-action cylinder in view of opening the nip $N_1$.

The effect of the load on the rigidities depends substantially on the rigidities of the loading arm 60 and of the hydraulic cylinders 71,72. The rigidity of the loading arm 60 can also be made adjustable.

Figure 7:
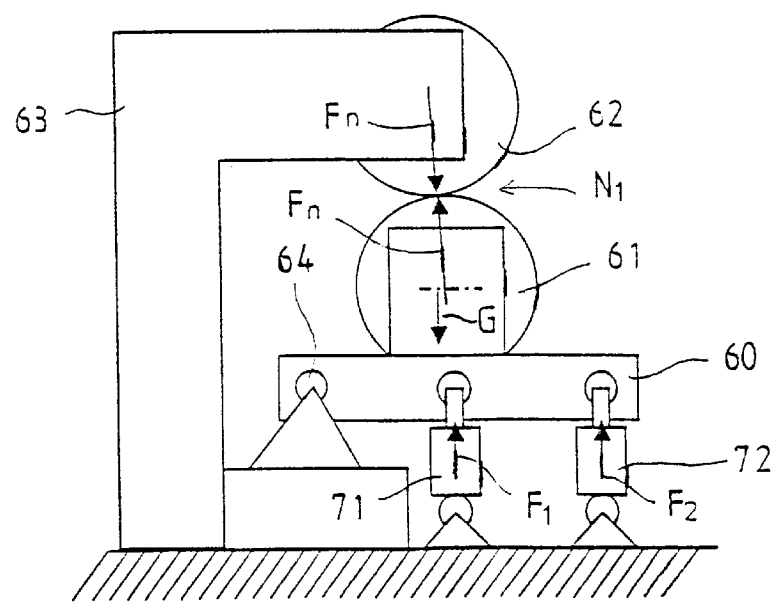
FIG. 7 illustrates a third loading beam in accordance with the invention whose rigidity can be regulated.

FIG. 7 illustrates a modification of the loading beam 60 as shown in FIG. 6 whose rigidity can be regulated. In this case, the loading arm 60, which is supported on the frame constructions of the device from one of its ends by means of an articulated joint 64, supports the lower roll 61 of the nip roll construction, By means of loading cylinders 71 and 72 installed between the loading beam 60 and the frame of the device, the nip $N_1$ between the rolls 61 and 62 is opened and closed and the linear load in said nip $N_1$ is regulated. The cylinders 71 and 72 are controlled herein analogically as compared with the embodiment shown in FIG. 6.

In the following, for the cylinders shown in FIGS. 1 . . . 3, equations of calculation of rigidity in different positions of operation will be derived. In the calculations, exclusively the pressure medium in the pressure spaces is taken into account. The rates of resilience of the cylinder mantles and the piston rods are relatively little, as compared with the resilience of pressure medium, and therefore they can be overlooked in this connection. On the other hand, the resilience of outside systems of hoses and of the contents of pressure media in said hoses ought to be minimized by selecting the constructions of throttles, valves, hoses, and other parts appropriately.

In the calculations, the following abbreviations will be used:

K=compression coefficient of pressure medium
F=cylinder force
u=movement of piston
A=cross-sectional area of piston at pressure side (inside cross-sectional area of cylinder)
$\alpha \cdot A$, $s \cdot \alpha \cdot A$=area of piston at counter-pressure side
a=length of pressure space at pressure side
b, c=lengths of pressure spaces at counter-pressure side
$b_1, c_1, b_2, c_2$=lengths of pressure spaces at counter-pressure side in positions I and II (FIG. 2)
l=overall length of pressure spaces
$k_a, k_b, k_c$=component elastic constants of pressure media in pressure spaces
$k_s$=overall elastic constant of cylinder
r=ratio of overall elastic constants in extreme positions of piston
$\gamma, \rho$=denotations of abbreviation
$p_a, p_b, p_c$=pressures in different pressure spaces (FIG. 1)
$V_a, V_b, V_c$=volumes of pressure spaces (FIG. 1)
$\Delta V_b, \Delta V_c$=changes in volumes of counter-pressure spaces (FIG. 1)
$p_1, p_2$=pressures at counter-pressure side (FIG. 2)
$pv_1, Pv_2$=pressures in pressure spaces at counter-pressure side (FIG. 2)
$\Delta p$=pressure difference of counter-pressure spaces (FIG. 2)

In the embodiment shown in FIG. 1, the calculations are as follows:

Connection between cylinder force and pressures:

$$F=A \cdot (p_a - s \cdot \alpha \cdot p_c)$$

$$F=A \cdot (p_a - \alpha \cdot p_c)$$

so that $p_b = s \cdot p_c$

Changes in volume:

$V_a$ is invariable in a running situation $$\Delta V_b = -\alpha \cdot u \cdot A$$

$$\Delta V_c = +\alpha \cdot u \cdot s \cdot A$$

so that $\Delta V_c = -s \cdot \Delta V_b$

Rigidity:

$$1 = a + b + c$$

$$\gamma = a/l$$

$$\rho = b/l$$

$$1 - \gamma - \rho = c/l$$

$$k_a = K \cdot A/a$$

$$k_b = \alpha \cdot K \cdot A/b$$

$$k_c = s \cdot \alpha \cdot K \cdot A/c$$

Thus, the overall rigidity is:

$$k_s = k_a + \frac{1}{\frac{1}{k_b} + \frac{1}{k_c}} = \frac{K \cdot A}{l} \cdot \left( \frac{1}{\gamma} + \frac{s + \alpha}{1 - \gamma + (s-1) \cdot \rho} \right)$$

the ratio of rigidity r in the positions $\rho = 0$ and $\rho = 1 - \gamma$ is $$r = \frac{1 - \gamma \cdot (1 - s \cdot \alpha)}{1 - \gamma \cdot (1 - \alpha)}$$

the upper limit of the ratio of rigidity is s, when $\gamma \to 1$

In the embodiment shown in FIG. 2, the calculations are as follows:

Connection between cylinder force and pressures:

In the position I $$pv_2 = pv_1 + \Delta p_1 \quad (pv_2 > pv_1)$$

$$F_1 = A \cdot (p_1 - \alpha p v_1 - \beta \cdot \Delta p_1)$$

In the position II $$pv_2 = pv_1 - \Delta p_2 \quad (pv_2 < pv_1)$$

$$F_2 = A \cdot (p_2 - \alpha \cdot p v_1 + \beta \cdot \Delta p_2)$$

It is required that $F_1 = F_2 = F$ and assumed that $\Delta p_1 = \Delta p_2 = \Delta p$ $$p_1 - p_2 = 2 \cdot \beta \cdot \Delta p \quad \text{(pressure fluctuation at pressure side)}$$

Rigidity:

$$l = a + b_1 + c_1 = a + b_2 + c_2 \therefore b_1 + c_1 = b_2 + c_2$$

it is chosen $b_1 = c_2$ and $b_2 = c_1$ $$a = \gamma \cdot 1$$

$$b_1 = c_2 = \rho \cdot 1$$

$$b_2 = c_1 = (1 - \gamma - \rho) \cdot l$$

In the position I:

$$k_{s1} = \frac{K \cdot A}{l} \cdot \left( \frac{1}{\gamma} + \frac{\beta}{1 - \gamma - \rho} \right)$$

In the position II:

$$k_{s2} = \frac{K \cdot A}{l} \cdot \left( \frac{1}{\gamma} + \frac{\beta}{\rho} \right)$$

Thus, the ratio of rigidity is:

$$r = \frac{k_{s1}}{k_{s2}}$$

In the embodiment shown in FIG. 3, the calculations are as follows:

Connection between cylinder force and pressures:

$$F = A \cdot (p_a - \alpha \cdot p_c)$$

$\alpha \cdot (p_c - p_b) + \beta \cdot (p_d - p_e) = 0$; term of equilibrium of inner cylinder The oscillation of the inner cylinder is controlled by means of changes in volumes of different chambers.

Rigidity:

$$l = a + b + c + d + e$$

$x$ = minimal distance between moving parts $a = \gamma \cdot l; \gamma = 2 \cdot /1 \ldots 1 - 4 \cdot x/l$ $b = e = \rho \cdot l; \rho = x/l \ldots x/l + 1_j/l$ $c = d = l_t + 2 \cdot x - b$ $l_j = l \cdot (1-\gamma)/2 - 2 \cdot x$; length of oscillation stroke of inner cylinder $l_s = l \cdot (1+\gamma)/2$; length of inner cylinder $l_v = l \cdot (1-\gamma)/2$; length of fixed piston rod $l_a = \gamma \cdot 1 - x$; opening length of cylinder (overall stroke)

$k_a = K \cdot A/a; k_b = K \cdot \alpha \cdot A/b; k_c = K \cdot \alpha \cdot A/c; k_d = K \cdot \beta \cdot A/d;$ $k_e = K \cdot \beta \cdot A/e$ Thus, the overall rigidity of the cylinder is:

$$k_s = k_a + \frac{k_c \cdot (k_b + k_d + k_e)}{k_b + k_c + k_d + k_e}$$

The limit values are:

$k_s \to k_a + k_b + k_d + k_e$; when $c \to 0$ $k_s \to k_a + k_c$; when $b \to 0$; or when $d \to 0$; or when $e \to 0$ Since the overall rigidity has finite limit values in respect of b, c, d and e, in practice it will be possible to run these almost into the closed position.

Figure 8A:
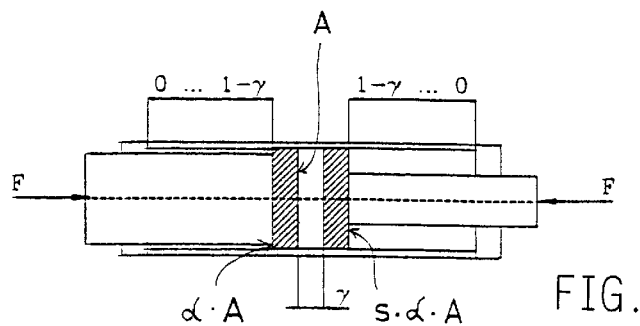
FIG. 8 shows the calculations of rigidity of a loading cylinder as shown in FIG. 1, illustrated by means of an exemplifying embodiment.
Figure 8B:
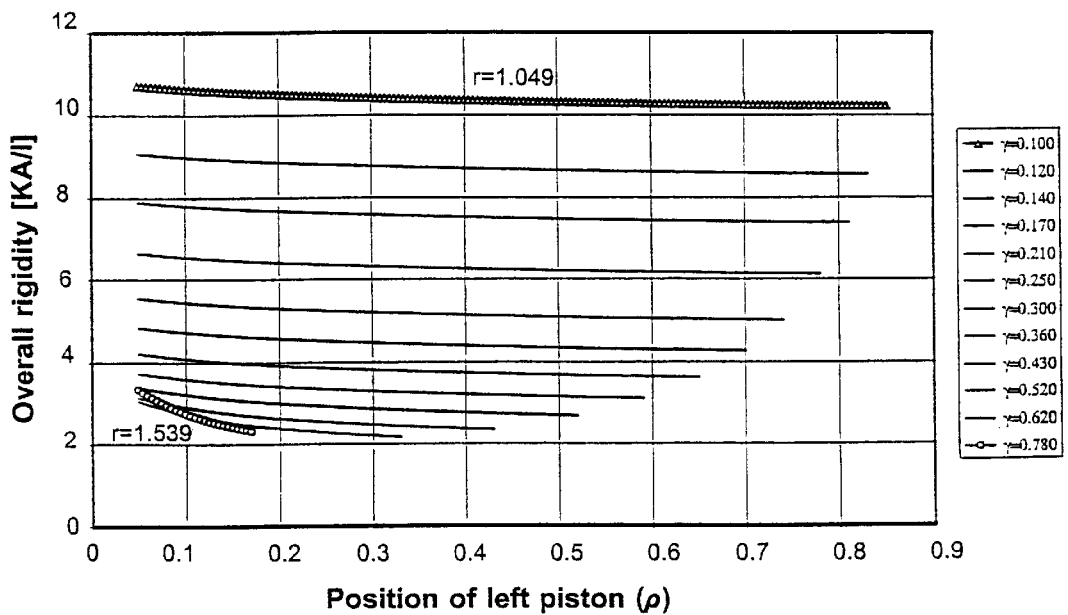

In FIGS. 8 ... 10, examples have been given of calculations of rigidity concerning loading cylinders that can be carried into effect in practice. The parameters $\alpha$, $\beta$ and s have been chosen as fixed at an extreme side in order that a maximal possible ratio of rigidity could be achieved.

FIG. 8 presents calculations based on the embodiment shown in FIG. 1. It is seen from the figure that a cylinder with a rigidity as high as possible is obtained with a low value of γ, which, however, lowers the ratio of rigidity r. The highest ratio of rigidity r≈1.54 is provided by the value γ=0.78, with which the amplitude of the oscillation movement of the piston is at the minimum. Values of rigidity higher than this are achieved if the piston can be placed closer to the end of the cylinder. A theoretical upper limit is s.

Figure 9A:
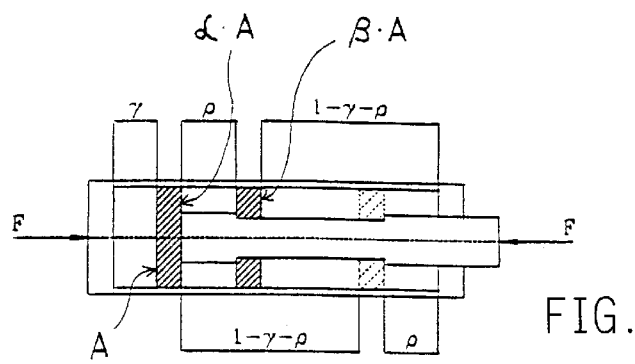
FIG. 9 shows the calculations of rigidity of a loading cylinder as shown in FIG. 2, illustrated by means of an exemplifying embodiment.
Figure 9B:
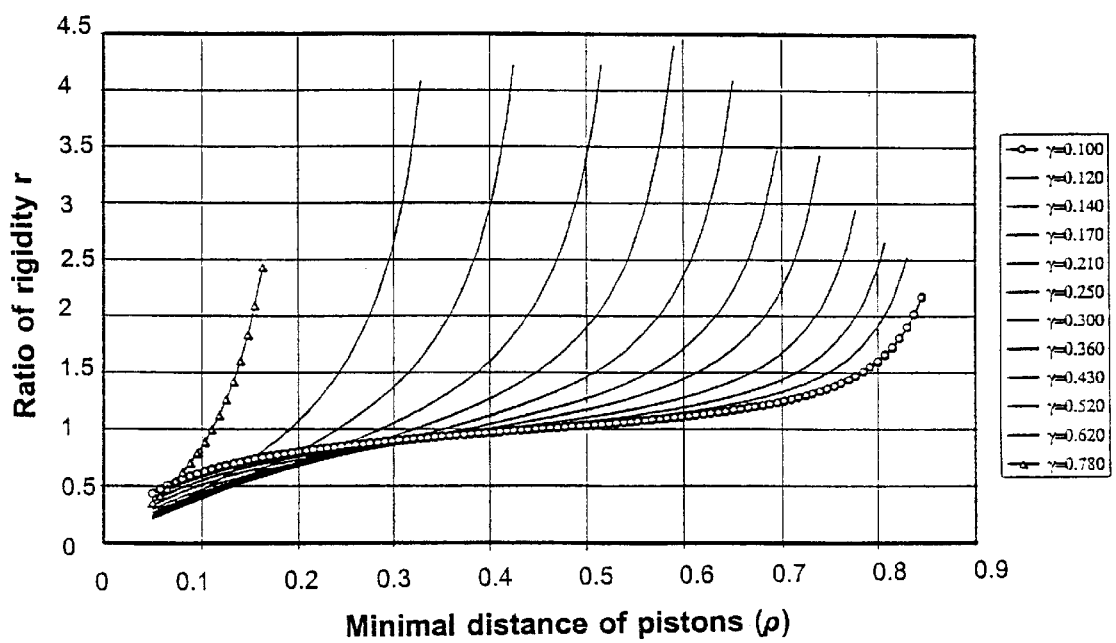

FIG. 9 presents calculations based on the embodiment shown in FIG. 2. The highest ratio of rigidity r≈4.39 is obtained with the values γ=0.36 and ρ=0.59. In such a case, the rigidity varies within the limits 4.05 . . . 17.78 [KA/l].

Figure 10A:
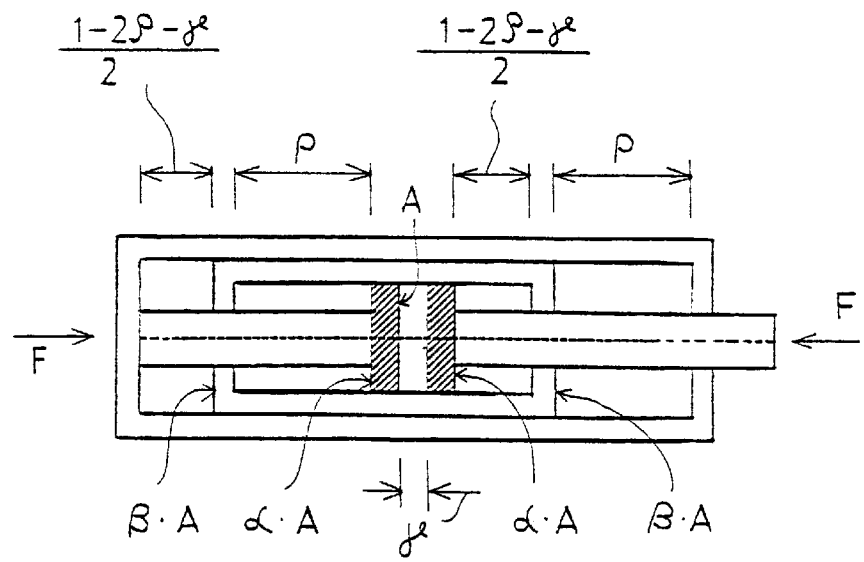
FIG. 10 shows the calculations of rigidity of a loading cylinder as shown in FIG. 3, illustrated by means of an exemplifying embodiment.
Figure 10B:
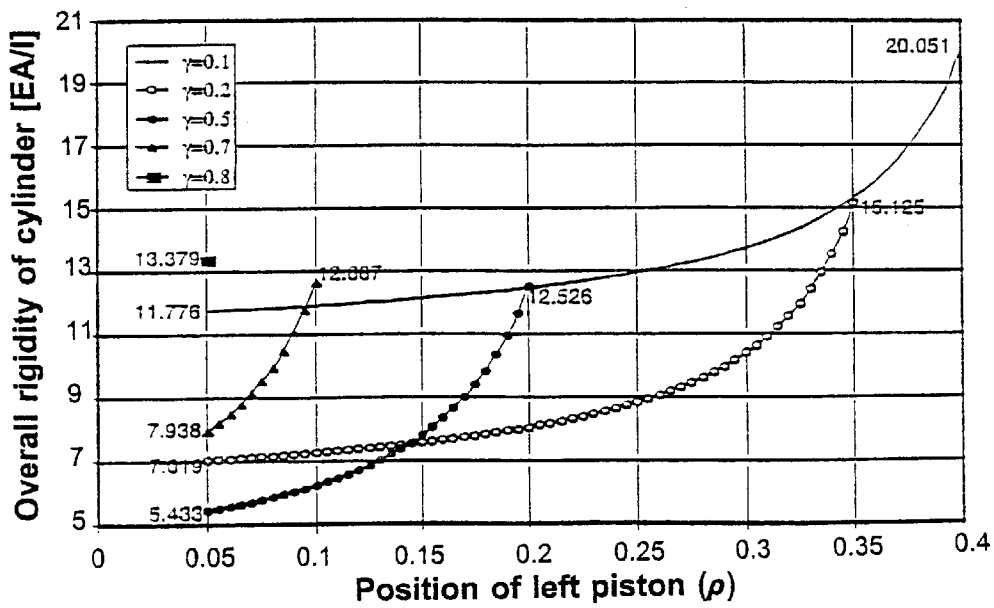

FIG. 10 presents calculations based on the embodiment shown in FIG. 3. This alternative embodiment provides a smooth variation of rigidity, such as the alternative illustrated in FIG. 8, but is more rigid and permits a higher variation in rigidity.

As compared with the alternative illustrated in FIG. 9, the alternative illustrated in FIG. 10 provides a rigidity of the same order of magnitude. On the contrary, the ratio of rigidity remains somewhat lower in this configuration. By means of variation of the diameters of the piston rods, a better value is likely to be obtained also in respect of the ratio of rigidity.

The differences in rigidity are still increased in the alternative illustrated in FIG. 10, and so also in the alternatives illustrated in FIGS. 8 and 9, if the inner cylinder can be run closer to an extreme limit. In the sets of curves, the limit 0.05×length of the overall fluid space in the cylinder has been used.

In the following, the patent claims will be given, and the details of the invention can show variation within the scope of the inventive idea defined in said claims and differ from what has been stated above by way of example only.

What is claimed is:

1. In a nip roll construction in a paper or board machine, a loading cylinder comprising at least one cylinder (11, 31, 41, 42) and at least two pistons (12, 13, 43, 44) which have been fitted into the cylinder (11, 31, 41, 42), wherein in addition to a work pressure space (16, 41a), the cylinder (11, 31, 41, 42) comprises at least two pressure spaces (18, 20, 22, 24, 42a, 42b), by whose means the static rigidity of the loading cylinder can be regulated while the linear load in the nip or the rest of the operation of the nip is not influenced.

2. A loading cylinder as claimed in claim 1, wherein the loading cylinder comprises:

a cylinder (11), through whose first end wall (11a) a first piston rod (14) is passed, to whose inner end a first piston (12) is fixed, said first piston (12) is placed in the interior of the cylinder (11), and through a second end wall (11b) of said cylinder (11) a second piston rod (15) is passed, to whose inner end a second piston (13) is fixed, said second piston (13) is placed in the interior of the cylinder (11), in which connection in a space defined by the first (12) and the second (13) piston and by an inner face of the cylinder (11), a first pressure space is formed, in a space defined by an outer face of the first piston rod (14), by the first piston (12), and by the inner face of the cylinder (11), a second pressure space (18) is formed, and in a space defined by an outer face of the second piston rod (15), by the second piston (13), and by the inner face of the cylinder (11), a third pressure space (20) is formed, in which connection the loading pressure of the loading cylinder is regulated by means of changes in the volume of the first pressure space (16), and the static rigidity of the loading cylinder is regulated by moving the cylinder (11) in an oscillating way on the piston rods (14,15) that remain stationary by means of changes in the volumes of the second (18) and the third (20) pressure space.

3. A loading cylinder as claimed in claim 2, wherein diameters ($D_1$, $D_2$) of the first (14) and the second (15) piston rod are of different magnitudes.

4. A loading cylinder as claimed in claim 1, wherein the loading cylinder comprises:

a cylinder (11), to whose first end wall (11a) a support arm (14) is attached and through whose second end wall (11b) a piston rod (15) is passed, to the inner end of said piston rod (15) a first piston (12) placed inside the cylinder (11) is attached, and onto a thinner portion (15a) of said piston rod (15) a second piston (13) placed inside the cylinder (11) has been fitted, said second piston (13) moves in an axial direction of the cylinder (11) on the thinner portion (15a) of the piston rod (15), in which connection, a first pressure space (16) is formed in a space defined by the first piston (12) and by an inner face of the cylinder (11), a second pressure space (18) a space defined by an outer face of the piston rod (15), by the first (12) and the second (13) piston, and by the inner face of the cylinder (11), and a third pressure space (20) is formed in a space defined by the outer face of the piston rod (15), by the second piston (13), and by the inner face of the cylinder (11), in which connection the loading pressure of the loading cylinder is regulated by means of changes in the volume of the first pressure space (16), and the static rigidity of the loading cylinder is regulated by displacing the second piston (13) in an oscillating way between its extreme positions on the thinner portion (15a) of the piston rod (15) and by means of changes in the volumes of the second (18) and the third (20) pressure space.

5. A loading cylinder as claimed in claim 1, wherein the loading cylinder comprises:

a first cylinder (11), through whose first end wall (11a) a first piston rod (14) is passed, to an inner end of said first piston rod a first piston (12) placed inside the first cylinder (11) is attached, and through a second end wall (11b) of said first cylinder (11) a second piston rod (15) is passed, to whose inner end a second piston (13) placed inside the first cylinder (11) is attached, in which connection a first pressure space (16) is formed in a space defined by the first (12) and the second (13) piston and by an inner face of the first cylinder (11), a second pressure space (18) is formed in a space defined by an outer face of the first piston rod (14), by the first piston (12), and by the inner face of the first cylinder (11), and a third pressure space (20) is formed in a space defined by an outer face of the second piston rod (15), by the second piston (13), and by the inner face of the first cylinder (11), and said loading cylinder further comprises:

a second cylinder (31) fitted onto an outer face of the first cylinder (11), the first piston rod (14) being attached to a first end wall (31 a) of said second cylinder (31), and the second piston rod (15) being passed through a second end wall (31b) of said second cylinder (31), in which connection a fourth pressure space (22) is formed in a space between the first end wall (11a) of the first cylinder (11), the outer face of the first piston rod (14), and an inner face of the second cylinder (31), and a fifth pressure space (24) is formed in a space between the second end wall (11b) of the first cylinder (11), the outer face of the second piston rod (15), and the inner face of the second cylinder (31), in which connection the loading pressure of the loading cylinder is regulated by means of changes in the volume of the first pressure space (16), and the static rigidity of the loading cylinder is regulated, by displacing the first cylinder (11) in an oscillating way on the first and second piston rods (14,15), by means of changes in the volumes of the second (18), third (20), fourth (22), and fifth (24) pressure space.

6. A loading cylinder as claimed in claim 5, wherein diameters ($D_1$, $D_2$) of the first (14) and the second (15) piston rod are of different magnitudes.

7. A loading cylinder as claimed in claim 1, wherein the loading cylinder comprises:

a cylinder (40) provided with two separate pressure spaces (41, 42), a first piston rod (45) passed through a first end wall (40a) of said cylinder (40), to an inner end of said first piston rod (45) a first piston (43) placed in a first pressure space (41) inside the cylinder (40) is attached, and a second piston rod (46) passed through a second end wall (40b) of said cylinder (40), to an inner end of said second piston rod (46) a second piston (44) placed in a second pressure space (42) inside the cylinder (40) is attached, in which connection the first piston (43) divides a first pressure space (41) into a loading-pressure space (41a) and into a counter-pressure pressure space (41b) placed between an outer face of the first piston rod (45) and an inner face of the cylinder (40), and the second piston (44) divides a second pressure space (42) into a rigidity-regulation pressure space (42a) placed between an outer face of the second piston rod (45) and the inner face of the cylinder (40) and into an expansion space (42b), into which an elastic piece (47) is fitted, which fills a part of a free space in the expansion space (42) in an idle state of the loading cylinder, in which connection the loading pressure of the loading cylinder is regulated by means of changes in the volume of the loading-pressure pressure space (41a) in the first pressure space (41), and the static rigidity of the loading cylinder is regulated by means of compression of the elastic piece (47).

8. In a nip roll construction in a paper or board machine, a loading beam comprising a beam (60) substantially shaped as a letter U lying on its side, in which connection, in its interior, a cavity (66) is formed, and into which at least one tightening device (66,67) has been fitted, by whose means the rigidity of the loading beam can be regulated.

9. A nip roll construction in a paper or board machine, comprising two rolls (61,62) which form a nip ($N_1$) with each other, of which rolls one roll has been attached rigidly to frame constructions of the machine, and the other roll has been suspended by means of a substantially horizontal loading beam (60) supported on the frame constructions of the machine by means of an articulated joint (64), wherein the nip roll construction further comprises two loading cylinders (71,72), which are placed in a substantially vertical plane at a distance from one another between the loading beam (60) and the frame constructions of the machine, in which case the rigidity of the loading beam (60) and the linear load in the nip ($N_1$) can be regulated by means of the two loading cylinders (71,72).

10. A method for changing the natural frequency for a nip roll construction in a paper or board machine comprising:

changing the natural frequency of the nip roll construction during operation so that the static rigidity of a loading beam in the nip roll construction is varied while the linear load in the nip or the rest of the operation of the nip is not influenced.

* * * * *